United States Patent [19]

Sandstrom et al.

[11] Patent Number: 6,070,634
[45] Date of Patent: *Jun. 6, 2000

[54] TIRE WITH TREAD MADE WITH LIQUID BLOCK COPOLYMER

[75] Inventors: Paul Harry Sandstrom, Tallmadge; Thomas Joseph Segatta, Copley; Bernard Matthew Bezilla, Jr., Stow, all of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,110

[22] Filed: Sep. 23, 1997

[51] Int. Cl.$^7$ .................................. B60C 1/00; B60C 9/02
[52] U.S. Cl. ......................... 152/564; 152/450; 152/451; 152/525; 524/501; 524/502; 524/516; 524/881; 525/243; 525/244; 525/247; 525/330.9; 525/331.9
[58] Field of Search ..................... 524/501, 502, 524/515, 881; 525/243, 244, 247, 30.9, 331.9; 152/564, 525, 450, 451

[56] References Cited

U.S. PATENT DOCUMENTS 5,672,639   9/1997   Corvasce et al. .................... 524/52

*Primary Examiner*—Duc Truong
*Attorney, Agent, or Firm*—Henry C Young, Jr

[57] ABSTRACT

This invention describes the use of liquid block isoprene-butadiene copolymers of approximately 25,000 to 100,000 $_v$ molecular weight, and which comprises 10 to 90% by weight isoprene and 90 to 10% by weight butadiene. This material is added to a rubber compound that contains natural rubber, isoprene rubber, styrene butadiene rubber and butadiene rubber, or blends thereof, the sum of which is equal to or greater than 50 phr of the entire rubber content formulation. The liquid block copolymer is used at low levels, typically 1.5 phr to 15 phr. The invention also includes tires with at least one component composed of such rubber composition such as a tire tread.

16 Claims, No Drawings

TIRE WITH TREAD MADE WITH LIQUID BLOCK COPOLYMER

TECHNICAL FIELD OF INVENTION

The present invention relates to the use of liquid block isoprene-butadiene copolymers in various elastomeric compositions, including the use of the same in tires.

BACKGROUND

The use of liquid polymers in polyblend compositions has been tried in the past, typically however using liquid polymers derived from a single monomer. The incorporation of these liquid polymers typically decreased the physical properties of the resulting composition. This invention capitalizes on the use of a liquid block copolymer which comprises both isoprene and butadiene in an elastomeric composition. This elastomeric composition is useful in for example, the preparation of tires, having at least a portion which contains the liquid block copolymer.

Rubbers are typically compounded with numerous chemical agents prior to being molded and cured into desired articles of manufacture. The rubber compounding procedure utilized is normally carried out in a mixing device which relies on shearing forces, such as a Banbury mixer or a mill mixer. During this compounding procedure, the rubber is commonly mixed with sulfur, accelerators, carbon black, antidegradants, and other desired rubber chemicals. It is also very common to blend more than one type of rubber in the compounding procedure.

The high shearing forces required to attain homogeneous mixtures result in a degradation of the rubber. For this reason, the Mooney viscosity of the rubber being compounded decreases during the mixing procedure. This problem becomes more serious in rubber compounds which contain reinforcing materials, such as carbon black, which are included to increase the modulus of rubber. It is known that rubber compounds which contain large amounts of carbon black are particularly difficult to process. Nevertheless, it is often necessary to include significant amounts of carbon black in rubber compounds to attain the desired modulus.

Processing oils are known to improve the processability of rubbers. However, the inclusion of processing oils in such rubbers results in a decrease in modulus. Accordingly, the inclusion of substantial amounts of processing oils in rubber compounds is frequently not a viable option for attaining good processability.

High rubber performance requirements have traditionally necessitated compounding rubbers which have very poor processability characteristics. It has been known to add a liquid polymer covulcanizable with a rubbery polymer for the purpose of obtaining a rubber composition which has improved processability and can give vulcanizates having improved tensile properties. The resulting rubber composition, however, has the defect in that vulcanizates from it have degraded dynamic properties, for example, reduced rebound resilience. It is also known to add lubricants such as mineral oil and waxes to improve the elongation at fail of such polyblends. However, such additives lower the tensile strength and heat distortion temperature and have not improved overall toughness.

What has not, however, been taught in the prior art, is a way to incorporate liquid block copolymers into vulcanizable rubbers without a corresponding decrease in the physical properties of the rubber.

The term "phr" as used herein, and according to conventional practice, refers to "parts of a respective material per 100 parts by weight of rubber elastomer". In the description of this invention, the terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and such terms are well known to those having skill in the rubber mixing or rubber compounding art.

SUMMARY OF THE INVENTION

This invention describes the use of liquid block isoprene-butadiene copolymers of approximately 25,000 to 100,000 $_v$ (viscosity average) molecular weight, more preferably 35,000 to 75,000, most preferably 40,000 to 60,000, and which comprise 10 to 90% by weight isoprene and 90 to 10% by weight butadiene, more preferably 10 to 30% by weight isoprene and 90 to 70% by weight butadiene. This material is added to a base rubber compound that contains natural rubber, isoprene rubber, styrene butadiene rubber and butadiene rubber, or blends thereof. The liquid block copolymer additive is used at low levels, typically 1.5 phr to 15 phr, based on 100 phr base rubber in the formulation.

DETAILED DESCRIPTION OF THE INVENTION

This invention employs the use of liquid block isoprene-butadiene copolymers of approximately 25,000 to 100,000 $_v$ molecular weight, more preferably 35,000 to 75,000, still more preferred 40,000 to 60,000, and most preferably, 50,000 molecular weight and which comprises 10 to 90% by weight isoprene.and 90 to 10% by weight butadiene, more preferably 10 to 30% by weight isoprene and 90 to 70% by weight butadiene. This material is added to an elastomeric composition, preferably a rubber compound that contains natural rubber, isoprene rubber, styrene butadiene rubber and butadiene rubber, or blends thereof. The liquid block copolymer additive is used at low levels, typically 1.5 phr to 15 phr, based on 100 phr base rubber in the formulation. By liquid block isoprene-butadiene copolymer, it is meant to include all compositions of block isoprene-butadiene copolymers, so long as the polymer is a liquid at room temperature. This generally means that the block copolymer is flowable or pourable at room temperature, typically 20° C. to 25° C.

In one aspect of this invention, the liquid block isoprene-butadiene copolymer is utilized to maintain the processability and improve the tear strength or crack growth resistance without negative impact on the rubber processing characteristics. In the practice of this invention, the rubber composition is typically a tread rubber composition, and is comprised of at least one diene-based elastomer, or rubber. Thus, it is considered that the elastomer is a sulfur curable, i.e., vulcanizable elastomer. The elastomers utilized in accordance with this invention typically contain conjugated diene monomers and/or non-conjugated diene monomers, typically from 4 to 12 carbon atoms and preferably contain from 4 to about 8 carbon atoms. Some representative examples of suitable conjugated diene monomers include 1,3-butadiene, cis-1,4-polyisoprene, 3,4-polyisoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The rubber elastomer can also contain various aromatic monomers, such as styrene, 1-vinylnaphthalene, 2-vinyl naphthalene, -methyl styrene, 4-phenyl styrene, 3-methyl styrene and the like. A nonexhaustive exemplary list of elastomers which can be prepared from the diene monomers and utilized in the rubber compositions of this invention include polybutadiene, styrene-butadiene rubber (SBR), synthetic polyisoprene, natural rubber, isoprene-butadiene rubber, nitrile rubber, carboxylated nitrile rubber, styrene/butadiene copolymer rubbers, butadiene/acrylonitrile copolymer rubbers, styrene/isoprene/butadiene terpolymer rubbers and EPDM rubbers.

In another aspect of this invention, the rubber comprises at least two diene based rubbers. For example, a combination of two or more rubbers may include in combination at least two of cis-1,4-polyisoprene (natural or synthetic, although natural is preferred), 3,4-polyisoprene rubber, styrene/isoprene/butadiene rubber, emulsion and solution polymerization derived styrene/butadiene rubbers, cis-1,4-polybutadiene rubbers and emulsion polymerization prepared butadiene/acrylonitrile copolymers.

In one aspect of this invention, an emulsion polymerization derived styrene-butadiene (E-SBR) may be used having a relatively conventional styrene content of about 20 to about 28% bound styrene or, for some applications, an E-SBR having a medium to relatively high bound styrene content, namely, a bound styrene content of about 30 to about 45%.

The relatively high styrene content of about 30 to about 45% for the E-SBR can be considered beneficial for a purpose of enhancing traction, or skid resistance, of the tire tread. The presence of the E-SBR is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, such as E-SBAR, in amounts for example, of about 2 to about 30 weight percent bound acrylonitrile in the terpolymer.

Emulsion polymerization prepared butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably 9 to about 36 weight percent. The S-SBR can be conveniently prepared, for example, by organo-lithium catalyzation in the presence of an organic hydrocarbon solvent. A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI is more fully described in U.S. Pat. No. 5,087,668 which is incorporated herein by reference.

The cis-1,4-polybutadiene rubber (BR) is considered to be beneficial for a purpose of enhancing the tire tread's wear or treadwear. Such BR can be prepared, for example, by organic solution polymerization of 1,3-butadiene. The BR may conveniently characterized, for example, by having at least a 90% cis-1,4 content. The cis-1,4-polyisoprene and cis 1,4-polyisoprene natural rubber are well known to those having skill in the rubber art.

While the focus above has been on tread rubber, the invention is not limited to such. Various diene-based elastomers may be used in the practice of this invention. Preferably, such elastomers are sulfur curable elastomers. For example, such elastomers may be selected from homopolymers and copolymers of conjugated dienes such as 1,3-butadiene and isoprene, and from copolymers of conjugated dienes such as, for example, 1,3-butadiene and/or isoprene with a vinyl aromatic compound such as styrene or -methylstyrene.

Representative of homopolymers of conjugated dienes are, for example, cis-1,4-polybutadiene, 1,3-polybutadiene and cis-1,4-polyisoprene. Representative of copolymers of conjugated dienes are, for example, isoprene/butadiene copolymers. Representative of copolymers of conjugated diene(s) and vinyl aromatic compounds are, for example, styrene butadiene copolymers and styrene/isoprene terpolymers.

The rubber compositions of this invention can be prepared by simply mixing the liquid polymer into the rubber elastomer. This can be done utilizing a wide variety of mixing techniques. In most cases, the mixing will be carried out utilizing a Banbury mixer or a mill mixer. It will generally preferred to mix the liquid polymer into the elastomer during the nonproductive compounding stage. By doing so, the benefit of improved processability is realized in both the preparation of the nonproductive compound and the productive compound. However, in the alternative, the liquid polymer can be mixed throughout the elastomer in a separate mixing stage. In such cases, it is advantageous to mix the liquid polymer into the elastomer before it is compounded with other materials to reap the benefits of improved processability during the preparation of the nonproductive and productive compounds. It should be noted that the nonproductive compounds do not contain a curative, such as sulfur, zinc oxide or accelerators. On the other hand, productive compounds contain a curative which will cure (vulcanize) the rubber after it is heated to a curing temperature.

Generally, from about 0.5 phr to about 40 phr of the liquid polymer will be mixed into the elastomer. The rubber compositions of this invention will preferably contain from about 1 phr to about 30 phr of the liquid polymer. It is typically more preferred for the rubber composition to contain from about 1.5 phr to about 15 phr of liquid polymer.

The liquid polymers are block isoprene-butadiene copolymers of approximately 25,000 to 100,000 $_v$ molecular weight, more preferably 35,000 to 75,000, most preferably 40,000 to 60,000, and which comprise 10 to 90% by weight isoprene and 90 to 10% by weight butadiene, more preferably 10 to 30% by weight isoprene and 90 to 70% by weight butadiene. This material is added to an elastomer, typically a rubber compound that contains natural rubber, isoprene rubber, styrene butadiene rubber and butadiene rubber, or blends thereof.

Included with the above definition of liquid block copolymers are A-B block copolymers, wherein the "A" block comprises a majority of polyisoprene and wherein the "B" block comprises mainly polybutadiene. As stated previously, the block copolymer will range from 10 to 90% by weight of the "A" block and from 90 to 10% by weight of the "B" block, although a more preferred range will be from 10 to 30% by weight "A" block and from 90 to 70% by weight "B" block. Within the definition of the "A" block, it is meant to include homopolymers of isoprene, and copolymers of isoprene wherein the isoprene units comprise at least 50% by weight, more preferably at least 70% by weight, and most preferably at least 90% by weight, of the "A" block. Within the definition of the "B" block, it is meant to include homopolymers of butadiene, and copolymers of butadiene wherein the butadiene units comprise at least 50% by weight, more preferably at least 70% by weight, and most preferably at least 90% by weight, of the "B" block.

The rubber compositions of this invention will frequently contain a variety of additional compounding ingredients and/or additives. Typically amounts of tackifier resins, if used, comprise about 0.5 to about 10 phr, usually about 1 to about 5 phr. Typical amounts of processing aids and rubber compounding ingredients comprise about 1 to about 50 phr. Such processing aids can include, for example, aromatic, naphthenic, and/or paraffinic processing oils. Stearic acid is typically referred to as a rubber compounding ingredient. As purchased, it typically contains primarily stearic acid with small amounts of at least one of oleic acid, linolenic acid and palmitolic and/or palmitic acid. The mixture may also contain small amounts (less than about six weight percent) of myristic acid, arachidic acid and/or arachidonic acid. Such material or mixture is conventionally referred to in the rubber compounding art as stearic acid. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 0.5 to about 3 phr. Typical amounts of fatty acids, if used, which can include stearic acid comprise about 0.5 to about 3 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

The rubber composition of this invention can also contain additional rubber chemicals, such as carbon black, antidegradants, oils, and waxes in conventional amounts. For instance, carbon black can be present in an amount ranging from 1 phr to about 100 phr.

In another alternative embodiment of this invention, the formulation can additionally contain silica and/or a silica coupling agent, wherein the amount of particulate silica ranges from about 5 to about 90, optionally about 25 to about 90 phr and wherein the silica coupling agent is contained in an amount from wherein the weight ratio of silica coupler to silica is from about 0.1/1 to about 0.2/1.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica might be expected to have an average ultimate particle size, for example, in the range of 0.01 to 0.05 micron as determined by the electron microscope, although the silica particles may be considered for use in this invention such as, only for example herein, and without limitation, silicas commercially available from PPG Industries under the Hi-Sil trademark with designations 210, 243, etc.; silicas available from Rhone-Poulenc with, for example, designations VN2 and VN3, and silicas from Akzo Chemical, etc.

The improved elastomeric compositions of this invention, preferably elastomeric rubber compositions, will have application as at least one composition in a tire. Preferably, the composition will be utilized as at least one component within a tread or a sidewall component in a tire.

The best mode for carrying out the invention will now be described for the purposes of illustrating the best mode known to the applicant at the time. The examples are illustrative only and not meant to limit the invention, as measured by the scope and spirit of the claims.

EXAMPLES

A series of experiments were undertaken to demonstrate the effect of the use of liquid block isoprene-butadiene rubber (LIBR) copolymers in various elastomeric formulations. Tables I, III, V and VII detail the compositions summarized below and characterized in Tables II, IV, VI and VIII.

| # | Elastomer (phr) | Carbon Black (phr) | Silica (phr) | Oil (phr) | LIBR (phr) |
|---|---|---|---|---|---|
| 1 | cis-polyisoprene rubber (100) | 45 | | 10.0 | |
| 2 | cis-polyisoprene rubber (100) | 45 | | 7.5 | 2.5 |
| 3 | cis-polyisoprene rubber (100) | 45 | | 5.0 | 5.0 |
| 4 | cis-polyisoprene rubber (100) | 45 | | | 10.0 |
| 5 | styrene butadiene rubber (100) | 45 | | 10.0 | |
| 6 | styrene butadiene rubber (100) | 45 | | 7.5 | 2.5 |
| 7 | styrene butadiene rubber (100) | 45 | | 5.0 | 5.0 |
| 8 | styrene butadiene rubber (100) | 45 | | | 10.0 |
| 9 | cis-polyisoprene (50)/styrene butadiene rubber (50) | 45 | | 10.0 | |
| 10 | cis-polyisoprene (50)/styrene butadiene rubber (50) | 45 | | 7.5 | 2.5 |
| 11 | cis-polyisoprene (50)/styrene butadiene rubber (50) | 45 | | 5.0 | 5.0 |
| 12 | cis-polyisoprene (50)/styrene butadiene rubber (50) | 45 | | | 10.0 |
| 13 | cis-polyisoprene (50)/cis-polybutadiene rubber (50) | 45 | | 10.0 | |
| 14 | cis-polyisoprene (50)/cis-polybutadiene rubber (50) | 45 | | 7.5 | 2.5 |
| 15 | cis-polyisoprene (50)/cis-polybutadiene rubber (50) | 45 | | 5.0 | 5.0 |
| 16 | cis-polyisoprene (50)/cis-polybutadiene rubber (50) | 45 | | | 10.0 |
| 17 | cis-polyisoprene rubber (100) | 35 | 15 | 10.0 | |
| 18 | cis-polyisoprene rubber (100) | 35 | 15 | 7.5 | 2.5 |
| 19 | cis-polyisoprene rubber (100) | 35 | 15 | 5.0 | 5.0 |
| 20 | cis-polyisoprene rubber (100) | 35 | 15 | | 10.0 |
| 21 | cis-polyisoprene rubber (100) | 48 | 10 | 5/3* | |
| 22 | cis-polyisoprene rubber (100) | 48 | 10 | 5/0* | 3 |
| 23 | cis-polyisoprene rubber (100) | 48 | 10 | | 8 |

*wood rosin/aromatic processing oil quantities

TABLE 1

| Compound (phr) | #1 Cntrl | #2 +2.5 LIBR | #3 +5 LIBR | #4 +10 LIBR | #5 Cntrl | #6 +2.5 LIBR | #7 +5 LIBR | #8 +10 LIBR |
|---|---|---|---|---|---|---|---|---|
| cis-polyisoprene[1] | 100 | 100 | 100 | 100 | | | | |
| emulsion SBR[2] | | | | | 100 | 100 | 100 | 100 |
| carbon black[3] | 45 | 45 | 45 | 45 | 45 | 45 | 45 | 45 |
| fatty acid[4] | 2 | 2 | 2 | 2 | 2 | 2 | 2 | 2 |
| processing oil[5] | 10 | 7.5 | 5 | 0 | 10 | 7.5 | 5 | 0 |
| anti-oxidant[6] | 2 | 2 | 2 | 2 | 2 | 2 | 2 | 2 |
| LIBR[7] | 0 | 2.5 | 5 | 10 | 0 | 2.5 | 5 | 10 |
| sulfur | 1.2 | 1.2 | 1.2 | 1.2 | 1 | 1 | 1 | 1 |
| accelerator[8] | 1.6 | 1.6 | 1.6 | 1.6 | 1.3 | 1.3 | 1.3 | 1.3 |
| accelerator[9] | | | | | 0.75 | 0.75 | 0.75 | 0.75 |
| retarder[10] | 0.5 | 0.5 | 0.5 | 0.5 | | | | |

[1]Synthetic cis 1,4-polyisoprene known as NATSYN® NAT 2200 from The Goodyear Tire & Rubber Company;
[2]PLF 1502 from The Goodyear Tire & Rubber Company;
[3]GPT (General Purpose Tread) carbon black;
[4]Stearic acid (majority component);
[5]Naphthenic/paraffinic processing oil;
[6]N-(1,3-dimethylbutyl)-N-phenyl-1,4-phenylenediamine;
[7]Liquid isoprene butadiene rubber known as LIR-390 from Kuraray Co. Ltd. (47,000 $_v$ );
[8]N-t-butyl-2-benzothiazolesulfenamide;
[9]Diphenyl guanidine; and
[10]N-cyclohexyl thiothalinide.

TABLE II

| Physical Properties | #1 Cntrl | #2 +2.5 LIBR | #3 +5 LIBR | #4 +10 LIBR | #5 Cntrl | #6 +2.5 LIBR | #7 +5 LIBR | #8 +10 LIBR |
|---|---|---|---|---|---|---|---|---|
| Modulus (36/150° C.[1] | | | | | | | | |
| 100% (MPa) | 1.70 | 1.69 | 1.72 | 1.75 | 1.70 | 1.70 | 1.70 | 1.73 |
| 200% (MPa) | 4.44 | 4.36 | 4.47 | 4.52 | 3.98 | 4.01 | 3.92 | 3.88 |
| 300% (MPa) | 8.76 | 8.66 | 8.89 | 9.04 | 7.93 | 8.01 | 7.84 | 7.70 |
| Tensile (MPa) | 20.95 | 21.00 | 21.31 | 21.27 | 18.42 | 19.75 | 19.47 | 20.83 |
| % elongation | 570 | 571 | 571 | 564 | 571 | 599 | 598 | 636 |
| Hardness (RT) | 56.2 | 55.7 | 56.6 | 56.7 | 58.0 | 57.1 | 58.4 | 58.6 |
| Hardness (100° C.) | 53.1 | 52.7 | 53.1 | 53.2 | 50.5 | 49.8 | 50.3 | 50.6 |
| Rebound (%-RT) | 51.8 | 51.8 | 50.8 | 50.3 | 45.7 | 46.1 | 45.8 | 45.8 |
| Rebound (%-100° C.) | 65.7 | 64.9 | 64.6 | 63.8 | 55.2 | 55.9 | 54.5 | 52.5 |
| Rheometer (150° C.) | | | | | | | | |
| $S_{MAX}$ (dNm) | 35.8 | 36.4 | 36.5 | 37.4 | 33.2 | 32.7 | 32.8 | 33.2 |
| $S_{MIN}$ (dNm) | 7.0 | 6.9 | 7.4 | 7.8 | 4.6 | 4.5 | 4.5 | 4.7 |
| Delta S (dNm) | 28.8 | 29.5 | 29.1 | 29.6 | 28.6 | 28.2 | 28.2 | 28.5 |
| $T_1$ (min) | 13.5 | 13.7 | 14.5 | 14.0 | 8.0 | 8.4 | 8.2 | 8.0 |
| $T_{25}$ (min) | 19.2 | 19.4 | 19.2 | 19.2 | 11.3 | 11.6 | 11.4 | 11.0 |
| $T_{90}$ (min) | 23.9 | 24.0 | 23.8 | 24.0 | 18.5 | 18.5 | 18.6 | 18.7 |
| Strebler Adhesion[2] | | | | | | | | |
| Avg. (95° C. to self) (newtons) | 95.2 | 110.7 | 82.0 | 102.1 | 99.0 | 92.8 | 99.2 | 116.1 |
| Avg. (RT to self) (newtons) | 136.3 | 148.7 | 128.7 | 127.0 | 124.3 | 122.3 | 130.7 | 146.7 |
| Treadwear[3] | | | | | | | | |
| DIN abrasion | 134 | 126 | 126 | 118 | 96 | 101 | 99 | 93 |
| Crack Growth Resistance[4] | | | | | | | | |
| PG Flex Hot in 32nds in/min | 4/240 | 3/240 | 2/240 | 3/240 | 38/60 | 41/60 | 33/60 | 1/240 |

[1]ASTM D/412
[2]Determined by pulling one compound away from another at a right angle to the untorn test specimen with the two ends being pulled apart at a 180 angle to each other using an Instron machine, the area of contact was determined from placement of a Mylar sheet between the compounds during cure, and a window in the Mylar allowed the two materials to come into contact with each other during testing;
[3]DIN 53516; and
[4]Pierced Groove Flex test measured at 93° C. @ 360 cycles/min using a conical pierce of 1/32" diameter using a 6" × 1.5" × 0.25" sample using 180° flex wherein the flex region is a 1/4" diameter molded groove against the grain of the sample.

TABLE III

| Compound (phr) | #9 Cntrl | #10 +2.5 LIBR | #11 +5 LIBR | #12 +10 LIBR | #13 Cntrl | #14 +2.5 LIBR | #15 +5 LIBR | #16 +10 LIBR |
|---|---|---|---|---|---|---|---|---|
| cis-polyisoprene[1] | 50 | 50 | 50 | 50 | 50 | 50 | 50 | 50 |
| emulsion SBR[2] | 50 | 50 | 50 | 50 | | | | |
| cis-polybutadiene[3] | | | | | 50 | 50 | 50 | 50 |
| carbon black[4] | 45 | 45 | 45 | 45 | 45 | 45 | 45 | 45 |
| fatty acid[5] | 2 | 2 | 2 | 2 | 2 | 2 | 2 | 2 |
| processing oil[6] | 10 | 7.5 | 5 | 0 | 10 | 7.5 | 5 | 0 |
| ZnO | 3 | 3 | 3 | 3 | 3 | 3 | 3 | 3 |
| anti-oxidant[7] | 2 | 2 | 2 | 2 | 2 | 2 | 2 | 2 |
| LIBR[8] | 0 | 2.5 | 5 | 10 | 0 | 2.5 | 5 | 10 |

TABLE III-continued

| Compound (phr) | #9 Cntrl | #10 +2.5 LIBR | #11 +5 LIBR | #12 +10 LIBR | #13 Cntrl | #14 +2.5 LIBR | #15 +5 LIBR | #16 +10 LIBR |
|---|---|---|---|---|---|---|---|---|
| sulfur | 1.1 | 1.1 | 1.1 | 1.1 | 1.2 | 1.2 | 1.2 | 1.2 |
| accelerator[9] | 1.45 | 1.45 | 1.45 | 1.45 | 1.6 | 1.6 | 1.6 | 1.6 |

[1]Synthetic cis-1,4-polyisoprene known as NATSYN ® NAT 2200 from The Goodyear Tire & Rubber Company;
[2]PLF 1502 from The Goodyear Tire & Rubber Company;
[3]High cis-1,4-polybutadiene known as BUDENE ® 1207 from The Goodyear Tire & Rubber Company;
[4]GPT (General Purpose Tread) carbon black;
[5]Stearic acid (majority component);
[6]Naphthenic/paraffinic processing oil;
[7]N-(1,3-dimethylbutyl)-N-phenyl-1,4-phenylenediamine;
[8]Liquid isoprene butadiene rubber known as LIR-390 from Kuraray Co. Ltd. (47,000 $_v$); and
[9]N-t-butyl-2-benzothiazolesulfenamide.

TABLE IV

| Physical | #9 Cntrl | #10 +2.5 LIBR | #11 +5 LIBR | #12 +10 LIBR | #13 Cntrl | #14 +2.5 LIBR | #15 +5 LIBR | #16 +10 LIBR |
|---|---|---|---|---|---|---|---|---|
| Modulus 36/150° C.[1] | | | | | | | | |
| 100% (MPa) | 1.74 | 1.74 | 1.78 | 1.76 | 1.98 | 1.96 | 1.97 | 1.97 |
| 200% (MPa) | 4.26 | 4.19 | 4.29 | 4.18 | 4.69 | 4.90 | 4.79 | 4.72 |
| 300% (MPa) | 8.40 | 8.27 | 8.47 | 8.31 | 9.00 | 9.54 | 9.33 | 9.28 |
| Tensile (MPa) | 19.70 | 19.48 | 20.36 | 19.67 | 16.63 | 17.93 | 17.93 | 19.09 |
| % elongation | 564 | 566 | 575 | 565 | 486 | 494 | 503 | 523 |
| Hardness (RT) | 57.1 | 56.7 | 57.2 | 57.5 | 59.0 | 58.5 | 59.4 | 59.2 |
| Hardness (100° C.) | 51.6 | 50.1 | 52.3 | 52.3 | 57.0 | 56.8 | 57.9 | 57.3 |
| Rebound (%-RT) | 47.1 | 47.1 | 46.8 | 46.4 | 59.8 | 59.5 | 58.5 | 56.9 |
| Rebound (%-100° C.) | 60.6 | 59.5 | 59.0 | 57.4 | 70.3 | 69.7 | 68.7 | 67.0 |
| Rheometer (150° C.) | | | | | | | | |
| $S_{MAX}$ (dNm) | 35.3 | 35.2 | 35.5 | 35.7 | 42.4 | 43.5 | 43.0 | 43.5 |
| $S_{MIN}$ (dNm) | 5.9 | 5.8 | 5.7 | 5.9 | 7.5 | 7.9 | 7.7 | 8.2 |
| Delta S (dNm) | 29.4 | 29.4 | 29.8 | 29.8 | 34.9 | 35.6 | 35.3 | 37.3 |
| $T_1$ (min) | 9.5 | 9.5 | 9.5 | 9.2 | 6.5 | 6.8 | 6.7 | 6.4 |
| $T_{25}$ (min) | 13.7 | 13.5 | 13.9 | 13.8 | 9.6 | 9.8 | 9.8 | 9.5 |
| $T_{90}$ (min) | 21.5 | 21.0 | 22.5 | 21.8 | 13.7 | 13.8 | 14.0 | 13.8 |
| Strebler Adhesion[2] | | | | | | | | |
| Avg. (95° C. to self) | 136.3 | 143.3 | 143.7 | 168.8 | 77.9 | 75.2 | 80.5 | 88.1 |
| Avg. (RT to self) | 72.3 | 80.5 | 77.4 | 91.0 | 55.4 | 55.2 | 59.5 | 62.3 |
| Treadwear[3] | | | | | | | | |
| DIN Abrasion | 105 | 105 | 100 | 92 | 30 | 28 | 30 | 27 |
| Crack Growth Resistance[4] | | | | | | | | |
| PG Flex Hot in 32nds in/min | 48/240 | 48/240 | 48/180 | 2/240 | 48/60 | 48/120 | 48/120 | 48/120 |

[1]ASTM D/412
[2]Determined by pulling one compound away from another at a right angle to the untorn test specimen with the two ends being pulled apart at a 180 angle to each other using an Instron machine, the area of contact was determined from placement of a Mylar sheet between the compounds during cure, and a window in the Mylar allowed the two materials to come into contact with each other during testing;
[3]DIN 53516; and
[4]Pierced Groove Flex test measured at 93° C. @ 360 cycles/min using a conical pierce of 1/32 diameter using a 6 × 1.5 × 0.25 sample using 180 flex wherein the flex region is a 1/4 diameter molded groove against the grain of the sample.

TABLE V

| Compound (phr) | #17 Control | #18 +2.5 LIBR | #19 +5 LIBR | #20 +10 LIBR |
|---|---|---|---|---|
| cis-polyisoprene[1] | 100 | 100 | 100 | 100 |
| carbon black[2] | 35 | 35 | 35 | 35 |
| fatty acid[3] | 2 | 2 | 2 | 2 |
| processing oil[4] | 10 | 7.5 | 5 | 0 |
| ZnO | 5 | 5 | 5 | 5 |
| anti-oxidant[5] | 2 | 2 | 2 | 2 |
| LIBR[6] | 0 | 2.5 | 5 | 10 |
| Silica[7] | 15 | 15 | 15 | 15 |
| coupling agent[8] | 3 | 3 | 3 | 3 |
| sulfur | 1.4 | 1.4 | 1.4 | 1.4 |
| accelerator[9] | 1 | 1 | 1 | 1 |

[1]Synthetic cis-1,4-polyisoprene known as NATSYN ® NAT 2200 from The Goodyear Tire & Rubber Company;
[2]GPT (General Purpose Tread) carbon black;
[3]Stearic acid (majority component);
[4]Naphthenic/paraffinic processing oil;
[5]N-(1,3-dimethylbutyl)-N-phenyl-1,4-phenylenediamine;
[6]Liquid isoprene butadiene rubber known as LIR-390 from Kuraray Co. Ltd. (47,000 $_v$);
[7]Hi-Sil 210 from PPG Industries;
[8]SI 69 from DeGussa;
[9]N-t-butyl-2-benzothiazolesulfenamide.

TABLE VI

| Physical | #17 Control | #18 +2.5 LIBR | #19 +5 LIBR | #20 +10 LIBR |
|---|---|---|---|---|
| 36/150° C.[1] | | | | |
| 100% (MPa) | 1.38 | 1.35 | 1.42 | 1.45 |
| 200% (MPa) | 3.37 | 3.28 | 3.43 | 3.49 |
| 300% (MPa) | 6.45 | 6.35 | 6.61 | 6.78 |
| Tensile (MPa) | 16.02 | 16.04 | 17.63 | 17.56 |
| % elongation | 592 | 591 | 619 | 606 |
| Hardness (RT) | 52.1 | 52.6 | 53.9 | 53.8 |
| Hardness (100° C.) | 44.9 | 45.7 | 45.3 | 46.8 |
| Rebound (% @ RT) | 45.5 | 45.0 | 44.8 | 44.0 |
| Rebound (% @ 100° C.) | 58.7 | 57.7 | 57.4 | 55.4 |
| Rheometer (150° C.) | | | | |
| $S_{MAX}$ (dNm) | 30.6 | 30.4 | 31.2 | 31.4 |
| $S_{MIN}$ (dNm) | 4.0 | 4.0 | 4.6 | 4.9 |
| Delta S (dNm) | 26.6 | 26.4 | 26.6 | 26.5 |
| $T_1$ (min) | 9.0 | 9.0 | 9.0 | 8.8 |
| $T_{25}$ (min) | 13.5 | 13.5 | 13.5 | 13.5 |
| $T_{90}$ (min) | 20.0 | 20.6 | 20.5 | 21.0 |
| Strebler Adhesion[2] | | | | |
| Avg (95° C. to self) | 230 | 227 | 238 | 240 |
| Avg (RT to self) | 211 | 222 | 245 | 240 |
| Treadwear[3] | | | | |
| DIN Abrasion | 161 | 161 | 146 | 141 |
| Crack Growth Resistance[4] | | | | |
| PG Flex Hot in 32nds in/min | 1/240 | 1/240 | 1/240 | 1/240 |

[1]ASTM D/412
[2]Determined by pulling one compound away from another at a right angle to the untorn test specimen with the two ends being pulled apart at a 180 angle to each other using an Instron machine, the area of contact was determined from placement of a Mylar sheet between the compounds during cure, and a window in the Mylar allowed the two materials to come into contact with each other during testing;
[3]DIN 53516; and
[4]Pierced Groove Flex test measured at 93° C. @ 360 cycles/min using a conical pierce of 1/32 diameter using a 6 × 1.5 × 0.25 sample using 180 flex wherein the flex region is a 1/4 diameter molded groove against the grain of the sample.

TABLE VII

| Compound (phr) | #21 Control | #22 +3 LIBR | #23 +8 LIBR |
| --- | --- | --- | --- |
| emulsion SBR[1] | | | |
| wood rosin | 5 | 5 | |
| processing oil[2] | 3 | | |
| LIBR[3] | | 3 | 8 |
| carbon black[4] | 48 | 48 | 48 |
| silica[5] | 10 | 10 | 10 |

[1]PLF 1502 from The Goodyear Tire & Rubber Company;
[2]Naphthenic/paraffinic processing oil;
[3]Liquid isoprene butadiene rubber known as LIR-390 from Kuraray Co. Ltd. (47,000 $_v$);
[4]N220 Carbon Black; and
[5]Hi-Sil 210 from PPG Industries.

TABLE VIII

| Physical | #21 Control | #22 +3 LIBR | #23 +8 LIBR |
| --- | --- | --- | --- |
| 36/150° C.[1] | | | |
| 100% (MPa) | 1.90 | 1.90 | 1.90 |
| 300% (MPa) | 8.80 | 9.40 | 9.30 |
| Tensile (MPa) | 19.30 | 19.70 | 19.30 |
| % elongation | 581 | 564 | 551 |
| Hardness (RT) | 63.5 | 62.6 | 60.6 |
| Hardness (100) | 51.6 | 52.1 | 50.8 |
| Rebound (% @ RT) | 39.9 | 41.5 | 44.6 |
| Rebound (% @ 100° C.) | 53.7 | 54.8 | 56.1 |
| Rheometer (150° C.) | | | |
| $S_{MAX}$ (dNm) | 16.1 | 16.1 | 16.3 |
| $S_{MIN}$ (dNm) | 4.6 | 4.5 | 4.7 |
| Delta S (dNm) | 11.5 | 11.6 | 11.6 |
| $T_{25}$ (min) | 6.8 | 6.6 | 5.7 |
| $T_{90}$ (min) | 14.4 | 14.4 | 10.7 |
| Strebler Adhesion (95° C. to self)[2] | | | |
| Avg. | 235 | 272 | 309 |

[1]ASTM D/412;
[2]Determined by pulling one compound away from another at a right angle to the untorn test specimen with the two ends being pulled apart at a 180 angle to each other using an Instron machine, the area of contact was determined from placement of a Mylar sheet between the compounds during cure, and a window in the Mylar allowed the two materials to come into contact with each other during testing;

With reference to Tables I & II, example #1 shows a base control case of cis-polyisoprene rubber which has been compounded in a traditional manner with carbon black and conventional processing aids. The Strebler adhesion value (room temperature to self), a predictive measure of ultimate tear strength was 136.3 Newtons while the crack growth resistance of the rubber was given as 4/240 using the hot PG Flex test. This experimental baseline of 4/240 (crack length as measured in 1/32 of an inch over a defined period of time in minutes) would translate as a rate of 3/32 (4/32–1/32 (original hole)) in 240 minutes. The inclusion of increasing amounts of LIBR (2.5, 5.0 and 10.0 phr in place of corresponding amounts of processing oil) as seen in samples #2–190 4 wherein example #4 has complete replacement of the processing oil with LIBR, did not demonstrate any appreciable enhanced performance. In fact, the performance was degraded as measured by the average values of the Strebler adhesion test results.

A dramatic and significant a change was observed when the rubber was switched from cis-polyisoprene rubber to emulsion styrene-butadiene rubber. Adding increasing amounts of LIBR to this rubber formulation, (examples #6–#8) resulted in the baseline value of 38/60 for the crack growth rate, or 1.19 in 60 minutes. This poor crack growth rate value, i.e., the rubber was fairly easily torn, was dramatically decreased to 1/240 or no measured tear, in 240 minutes when 10 phr LIBR was added. Correspondingly, the Strebler adhesion values exhibited a desirable increase from a baseline value of 122.3 Newtons to 146.7 Newtons. This is contrary to the trend observed for the cis-polyisoprene rubber. Without being bound to any one theory, the aromatic content of this rubber coupled with the addition of LIBR is believed to play a role.

A similar improvement was observed in the cis-polyisoprene/emulsion styrene-butadiene rubber formulation described in Table III, (examples #9–#12) and as characterized in Table IV. The room temperature Strebler adhesion values exhibited an increase from a baseline of 72.3 Newtons to 91.0 Newtons and a corresponding increase was exhibited in the 95 C results which increased from 136.3 Newtons to 168.8 Newtons. A similar positive trend was also observed in the crack growth rate resistance as shown by the tear testing results which improved from 48/240 (1.5 in 240 minutes) to 2/240 (1/32 in 240 minutes). This trend once again, is contrary to that determined experimentally for the cis-polyisoprene rubber and demonstrates the value of the incorporation of an aromatic polymer into the rubber.

An improved result, was also observed for the cis-polyisoprene / cis-polybutadiene rubber formulation described in Table III, (examples #13–#16) and also as characterized in Table IV for the same physical testing parameters. The Strebler Adhesion values were increased from 55.4 to 62.3 Newtons, with an associated improvement in crack growth resistance by the inclusion of LIBR. The crack growth rate decreased by 50%, from 1.5 in 60 minutes to 1.5 in 120 minutes. This teaches that the improved results are not due solely to the incorporation of an aromatic monomer into the rubber, but rather can also be achieved by rubber blending of homopolydienes.

The effect of the inclusion of silica into the cis-polyisoprene formulation is shown in Table V (examples #17–#20) and the characterization results are displayed in Table VI. Once again, the Strebler adhesion results shows a favorable improvement with the inclusion of LIBR when compared to the control value. In this instance, the Strebler Adhesion values improved from a base of 211 Newtons to 240 Newtons. This is contrary to the expected results from an analysis of the trend observed for the same base rubber formulation of examples #1–#4, wherein the same Strebler Adhesion values decreased from 136.3 to 127.0 Newtons. The already low values for the crack growth rate were not improved upon.

In expanding the limits of the invention, the ability of LIBR to act as a replacement of at least a portion of typically used processing oils (e.g., wood rosin and aromatic processing oil) is demonstrated in the formulations shown in Table VII. In both the partial substitution, where 3 phr aromatic processing oil is replaced with LIBR, and in the complete substitution, wherein 3 phr aromatic processing oil and 5 phr wood rosin is replaced with LIBR, an improved Strebler adhesion value is obtained for the rubber formulations. This indicates that LIBR can be utilized in rubber formulations as at least a partial replacement for at least one of the typically used additives.

What has been demonstrated by the above examples, is that the incorporation of LIBR into a polyisoprene/carbon black rubber composition did not result in any measurable improvement in the physical properties of the composition as measured by Strebler adhesion values, a predictive measure of crack growth rate resistance. However, the incorporation of silica into this homopolydiene composition did result in a measurable improvement. The ability to improve the crack growth rate resistance however is not limited to the incorporation of silica, in that the addition of an aromatic containing polymer, e.g., SBR, also resulted in an improvement in the Strebler adhesion values as did the incorporation of a second different homopolydiene (e.g., polybutadiene). In the case of carbon black containing homopolydienes, it would appear that an improvement can be observed by: (1) the incorporation of an aromatic containing polymer; (2) the inclusion of silica; or (3) the blending of a second different homopolydiene. The incorporation of LIBR into a polyaromatic containing polymer/carbon black composition, e.g., emulsion SBR, also resulted in an improvement in crack growth rate resistance. The additional incorporation of silica was optional.

Therefore, what has been shown is that the incorporation of LIBR into polyaromatic containing rubber/carbon black compositions results in an improvement in crack growth rate resistance. Blending another polymer, e.g., polyisoprene into these formulations, will also result in an improved formulation. With homopolydienes, the improvement is noted only when carbon black and silica are used in combination or when the homopolydienes are blended with other aromatic-containing polymers or when two different homopolydienes are blended together.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A tire having a tread of a rubber composition comprised of, based upon 100 parts by weight rubber (phr), (A) about 1.5 to about 15 phr of a liquid block isoprene-butadiene copolymer having a molecular weight in a range of about 35,000 to about 75,000 and comprised of about 10 to about 30 percent by weight polyisoprene and about 90 to about 70 percent by weight polybutadiene and (13) 100 phr of a combination of at least one rubber and reinforcement of carbon black and/or silica, said combination consisting essentially of (1) cis 1,4-polyisoprene rubber and reinforcement as carbon black, exclusive of silica, (2) emulsion polymerization prepared styrene-butadiene copolymer rubber and reinforcement selected from at least one of carbon black and silica, (3) cis 1,4-polyisoprene rubber and emulsion polymerization prepared styrene-butadiene copolymer rubber and reinforcement selected from at least one of carbon black and silica and (4) cis 1,4-polyisoprene and cis 1,4-polybutadiene and reinforcement selected from at least one of carbon black and silica.

2. The tire of claim 1 wherein said rubber and reinforcement consists essentially of cis 1,4-polyisoprene rubber and carbon black.

3. The tire of claim 1 wherein said rubber consists essentially of emulsion polymerization prepared styrene-butadiene copolymer rubber and said reinforcement consists essentially of carbon black.

4. The tire of claim 1 wherein said rubber consists essentially of emulsion polymerization prepared styrene-butadiene copolymer rubber and said reinforcement consists essentially of carbon black and silica.

5. The tire of claim 1 wherein said rubber consists essentially of cis 1,4-polyisoprene and emulsion polymerization prepared styrene-butadiene copolymer rubber and said reinforcement consists essentially of carbon black.

6. The tire of claim 1 wherein said rubber consists essentially of cis 1,4-polyisoprene and emulsion polymerization prepared styrene-butadiene copolymer rubber and said reinforcement consists essentially of carbon black and silica.

7. The tire of claim 1 wherein said rubber consists essentially of cis 1,4-polyisoprene and cis 1,4-polybutadiene and said reinforcement consists essentially of carbon black.

8. The tire of claim 1 wherein said rubber consists essentially of cis 1,4-polyisoprene and cis 1,4-polybutadiene and said reinforcement consists essentially of carbon black and silica.

9. The tire of claim 1 wherein said tread is vulcanized with a sulfur vulcanization agent.

10. The tire of claim 2 wherein said tread is vulcanized with a sulfur vulcanization agent.

11. The tire of claim 3 wherein said tread is vulcanized with a sulfur vulcanization agent.

12. The tire of claim 4 wherein said tread is vulcanized with a sulfur vulcanization agent.

13. The tire of claim 5 wherein said tread is vulcanized with a sulfur vulcanization agent.

14. The tire of claim 6 wherein said tread is vulcanized with a sulfur vulcanization agent.

15. The tire of claim 7 wherein said tread is vulcanized with a sulfur vulcanization agent.

16. The tire of claim 8 wherein said tread is vulcanized with a sulfur vulcanization agent.

* * * * *